US012779683B1

(12) United States Patent
Matikainen

(10) Patent No.: US 12,779,683 B1
(45) Date of Patent: Nov. 3, 2026

(54) SIMULATED CONVERSATION HISTORY IN ROBOT PLANNING VIA A LANGUAGE MODEL AND RELATED TECHNOLOGY

(71) Applicant: Agility Robotics, Inc., Pittsburgh, PA (US)

(72) Inventor: Pyry Matikainen, Pittsburgh, PA (US)

(73) Assignee: Agility Robotics, Inc., Salem, OR (US)

( * ) Notice: Subject to any disclaimer, the term of this patent is extended or adjusted under 35 U.S.C. 154(b) by 136 days.

(21) Appl. No.: 18/772,540

(22) Filed: Jul. 15, 2024

Related U.S. Application Data

(60) Provisional application No. 63/659,479, filed on Jun. 13, 2024.

(51) Int. Cl.
*B25J 9/16* (2006.01)

(52) U.S. Cl.
CPC ........... *B25J 9/1661* (2013.01); *B25J 9/1658* (2013.01); *B25J 9/1664* (2013.01)

(58) Field of Classification Search
CPC ....... B25J 9/1661; B25J 9/1658; B25J 9/1664
See application file for complete search history.

(56) References Cited

U.S. PATENT DOCUMENTS

| | | | | |
|---|---|---|---|---|
| 10,185,542 | B2 | 1/2019 | Carson et al. | |
| 11,068,474 | B2 | 7/2021 | Ni et al. | |
| 11,893,358 | B1 | 2/2024 | Lakshmikanthan et al. | |
| 2022/0293102 | A1 | 9/2022 | Lee et al. | |
| 2023/0077528 | A1 | 3/2023 | Erdenee et al. | |
| 2024/0419903 | A1* | 12/2024 | Wu | G01C 21/34 |
| 2025/0042032 | A1* | 2/2025 | Singletary | B25J 9/1658 |

* cited by examiner

*Primary Examiner* — Jerrod Irvin Davis

(57) ABSTRACT

A method in accordance with at least some embodiments of the present technology includes providing preliminary input information to a generative artificial intelligence system. The preliminary input information includes a preliminary prompt. The method further includes receiving a preliminary response from the generative artificial intelligence system. The preliminary response corresponds to the preliminary input information. The method also includes generating a modified response at a computer system operably associated with a mobile robot. The modified response corresponds to the preliminary response. The method then includes providing subsequent input information to the generative artificial intelligence system. The subsequent input information includes the modified response. The method further includes receiving a subsequent response from the generative artificial intelligence system. The subsequent response corresponds to the subsequent input information. Finally, the method includes controlling the mobile robot based at least partially on the subsequent response.

19 Claims, 9 Drawing Sheets

SIMULATED CONVERSATION HISTORY IN ROBOT PLANNING VIA A LANGUAGE MODEL AND RELATED TECHNOLOGY

TECHNICAL FIELD

The present technology relates to robot planning.

BACKGROUND

Much of the work that humans currently perform is amenable to automation using robotics. For example, many human workers currently focus on executing predefined movements of items and containers at order-fulfillment centers. Such predefined movements may occur millions of times a day at a single order-fulfillment center and billions of times a day across a network of order-fulfillment centers. Human effort is better suited to more complex tasks, particularly those involving creativity, advanced problem solving, and social interaction. Presently, however, the need for order-fulfillment centers is large and rapidly increasing. Some analysts forecast a shortage of a million or more workers to staff order-fulfillment centers within the next ten to fifteen years. Due to the importance of this field, even small improvements in efficiency can have major impacts on macroeconomic productivity. For at least these reasons, there is a significant and growing need for innovation that supports automating tasks that humans currently perform at order-fulfillment centers and elsewhere.

BRIEF DESCRIPTION OF THE DRAWINGS

Certain aspects of the present technology can be better understood with reference to the following drawings.

DETAILED DESCRIPTION

Figure 1:
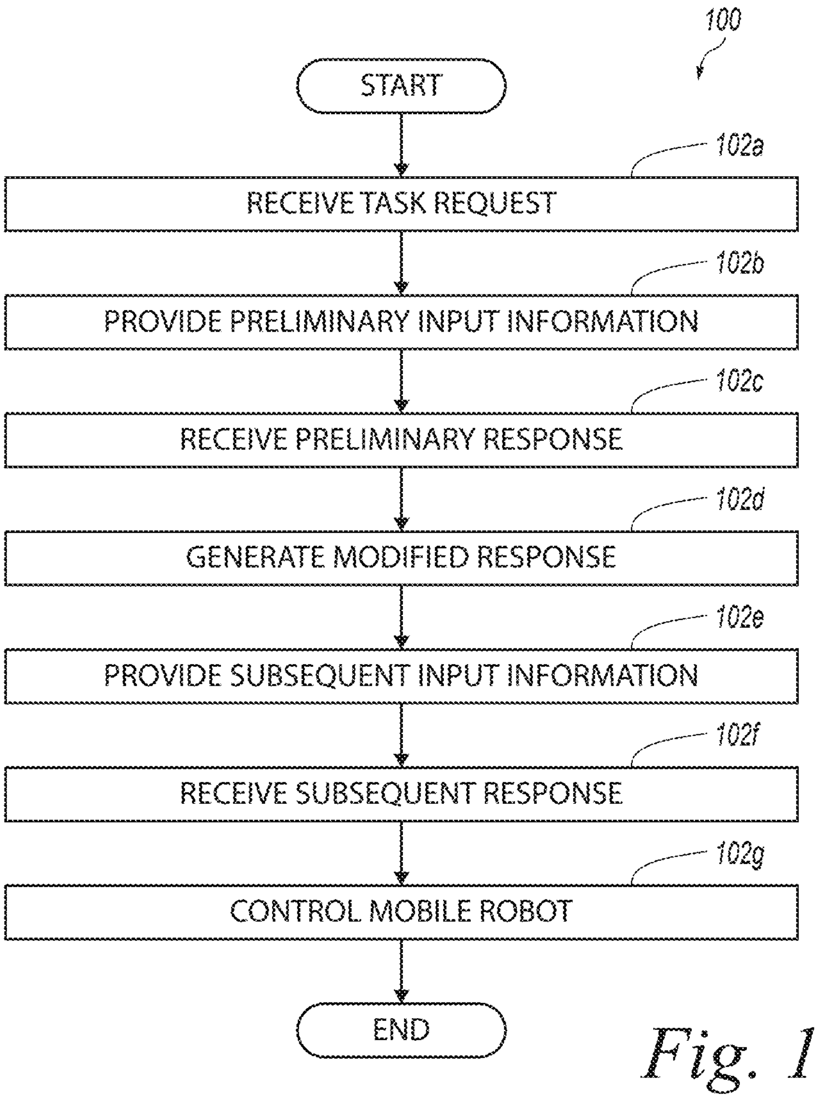
FIG. 1 is a block diagram corresponding to a method of planning in accordance with at least some embodiments of the present technology.

Disclosed herein are methods, devices, and systems related to robot planning. Methods in accordance with at least some embodiments of the present technology include innovative combinations of features that promote one or more useful objectives. These objectives include improving the reliability and/or useability of output from language model frameworks in the context of robot planning. Relevant language model frameworks include those based on large language models (LLMs) trained on natural-language data. In robotics, planning refers to defining actions that a robot should execute in furtherance of a goal. Examples of such actions include gathering sensor data, interpreting sensor data, walking to a location, grasping an object, etc. Corresponding goals can be short-horizon or long-horizon and simple or complex. For example, the goal of retrieving an object within a robot's reach is likely to be short-horizon and simple. In contrast, the goal of preparing a meal in an unknown environment is likely to be long-horizon and complex. A robot may execute actions within a plan via motion primitives. Moreover, at the most granular level, actuator commands corresponding to motion primitives and/or actions may be based on algorithms and/or models. Recent advancements in reinforcement learning, a type of artificial intelligence (AI), have greatly simplified the development of models for motion primitives and actions. AI also has potential to be a powerful tool in the context of robot planning.

LLMs, as a form of generative AI, are trained on data embodying human knowledge. Sources of this data include the Internet and digital archives. In an illustrative example, a framework including an LLM may receive a prompt from a user, tokenize constituents of the prompt, analyze relationships related to the tokens, and then predict constituents of an appropriate output to the prompt based on the relationships. Generating the output occurs incrementally as the LLM predicts and then adds output constituents to the overall response. LLMs can also remove or change output constituents that have already been added. Generating each output constituent involves processing predictions through layers of refinement. LLM parameters, which are analogous to memories, are the backbone of this processing. There is usually a direct correlation between the number of parameters in an LLM and the quality of the output from the LLM. The same tends to be true, albeit to a lesser extent, for the number of layers of refinement an LLM framework uses to predict output constituents. Currently, the LLMs most useful for robot planning are transformer based, meaning that they are developed and deployed with self-attention mechanisms to capture long-range dependencies. Other types of LLMs and other types of generative AI more broadly, however, also have significant potential to be useful for robot planning. For simplicity, the term LLM may be used herein to refer to a database of parameters and/or to an architecture, framework, etc. in which that database is used to generate output.

Two challenges of LLMs in the context of robot planning are reliability and useability. LLMs are unpredictable by nature. Furthermore, most currently available LLMs follow positive instructions (i.e., instructions to do something) more easily than negative instructions (i.e., instructions not to do something). This is partly because positive descriptions of actions are vastly more common than negative descriptions of actions in typical training data. Moreover, negative instructions tend to be more subjective than positive instructions. Accordingly, an LLM may ignore instructions to exclude certain types of information from a response. LLM output, therefore, frequently includes extraneous information. For example, some LLMs are prone to including conversational padding (e.g., "Sure! I can do that for you.") no matter how strongly they are told to avoid doing so. This can be problematic when LLM output is used as input into other, more traditional software. Traditional software, such as robot application programming interface (API) software that processes commands (e.g., function calls) to a robot, typically relies on predictable input. Furthermore, extraneous information in LLM output increases processing latency without providing any corresponding benefit. The number of output tokens is typically the largest factor affecting how long a generative AI system takes to produce a response. For these and/or other reasons, the practical utility of LLMs for robot planning has been limited to date.

With most LLMs, conversational history strongly affects output. Once an LLM has responded to a prompt in a particular form during a conversation, it tends to continue answering in that same form for the remainder of the conversation. An early malformed response, therefore, can easily derail an entire conversation by providing a bad example. This need not, however, be a limitation. Indeed, methods in accordance with at least some embodiments of the present technology leverage the influence of conversation history to at least partially mitigate other challenges of LLMs. For example, a method in accordance with at least some embodiments of the present technology includes modifying an LLM response to more closely correspond to a desired structure. The method further includes using the modified response in a simulated conversation history of a subsequent prompt. For example, when an LLM includes unwanted conversational padding in a response to a prompt, a method in accordance with at least some embodiments of the present technology may include generating a simulated conversation history in which the conversational padding is omitted. The method can further include presenting the simulated conversation history in a subsequent prompt. Because LLMs tend to follow conventions set within a current conversation, the presence of the simulated conversation history in the subsequent prompt may then increase the likelihood that the LLM will produce responses in a more advantageous format going forward.

The foregoing and many other features of methods, devices, and systems in accordance with various embodiments of the present technology are further described below with reference to FIGS. 1-10. Although methods, devices, and systems may be described herein primarily or entirely in the context of LLMs and bimanual, bipedal, mobile robots, other contexts are within the scope of the present technology. For example, suitable features of described methods, devices, and systems can be implemented in the context of other types of generative AI. Examples of other potentially useful types of generative AI include those based on AI models trained on data other than language data, such as vision data, action data, and/or other types of non-language data instead of or in addition to language data. Furthermore, suitable features of described methods, devices, and systems can be implemented in the context of mobile robots with one arm, in the context of mobile robots with more than two arms, and/or in the context of non-legged mobile robots. Furthermore, it should be understood, in general, that other methods, devices, and systems in addition to those disclosed herein are within the scope of the present technology. For example, methods, devices, and systems in accordance with embodiments of the present technology can have different and/or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Planning Methods

Figure 2:
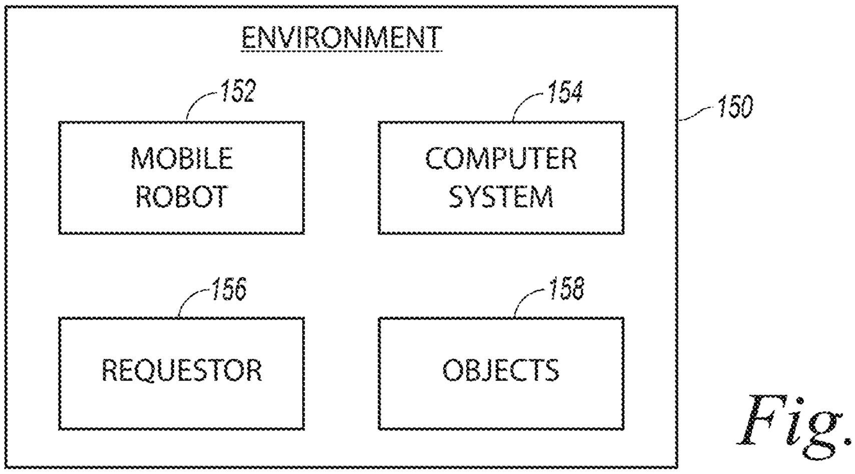
FIG. 2 is a block diagram depicting an environment relevant to the method of FIG. 1.
Figure 3:
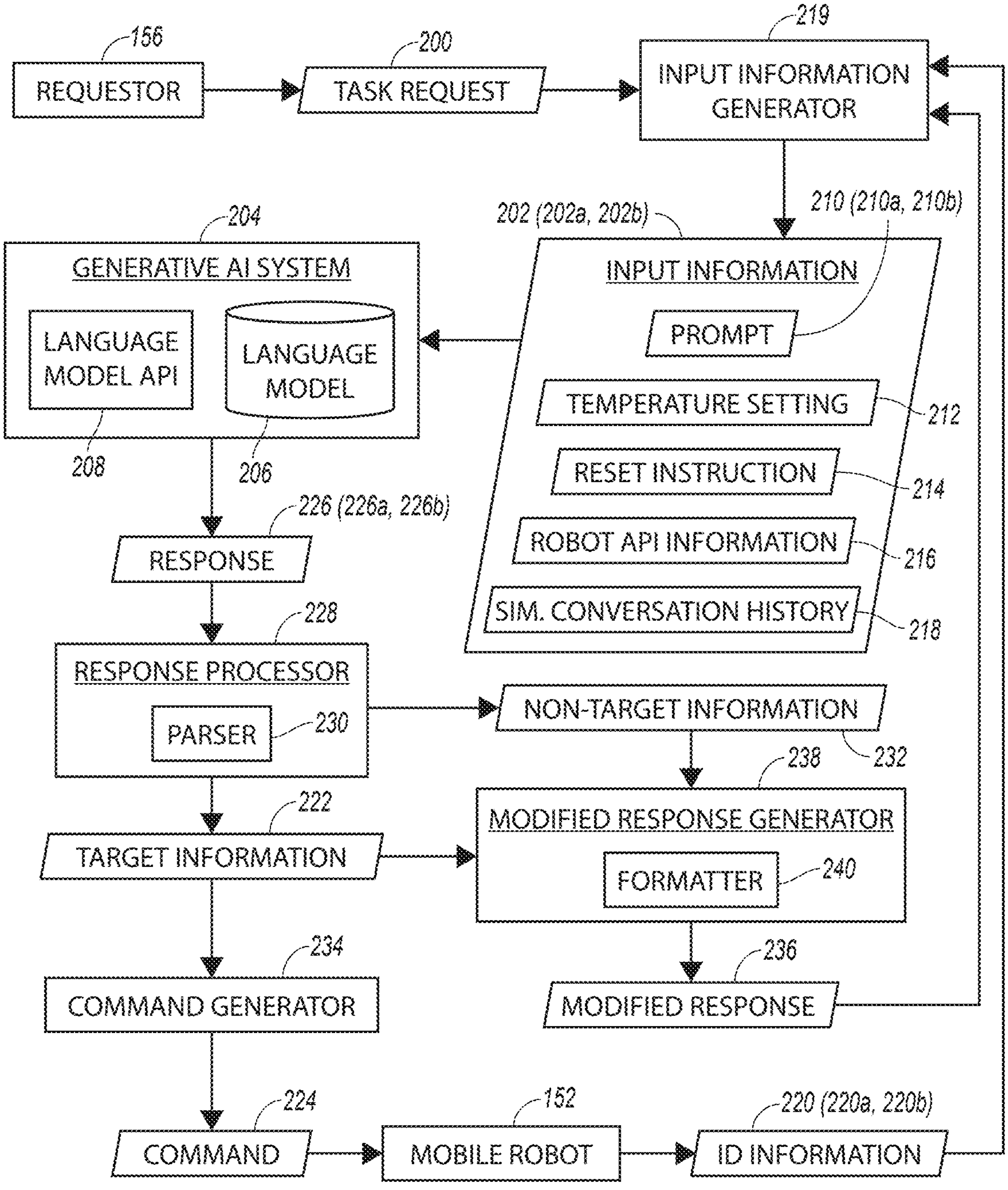
FIG. 3 is a block diagram illustrating an example of movement of information during an example of the method of FIG. 1.

FIG. 1 is a block diagram corresponding to a method 100 for planning in accordance with at least some embodiments of the present technology. The diagram includes blocks 102*a*-102*g* corresponding to different respective portions of the method 100. FIG. 2 is a block diagram illustrating an environment 150 at which an example of the method 100 can take place. As shown in FIG. 2, the environment 150 can include a mobile robot 152 and a computer system 154 operably associated with one another. Certain technical, implementation, and other details regarding the mobile robot 152 and the computer system 154 are provided below in the context of FIGS. 8-10. The environment 150 can also include a requestor 156 and objects 158 operably associated with the mobile robot 152 and with the computer system 154. FIG. 3 is a block diagram illustrating an example of movement of information between the mobile robot 152, the requestor 156, and selected components of the computer system 154 during an example of the method 100.

With reference to FIGS. 1-3 together, the method 100 can include receiving a task request 200 at the computer system 154 from the requestor 156 (block 102*a*). The requestor 156 can be a human. In these and other cases, the computer system 154 can receive the task request 200 from the requestor 156 as speech. For example, the task request 200 can be a natural language spoken request to complete a task. A few examples of the task request 200 include "clean up this room," "bring me something to eat," and "do the dishes." The task request can call for interacting with one or more of the objects 158. In at least some cases, the objects 158 and/or other features of the environment 150 relevant to completing the task request 200 are not immediately detectable by the mobile robot 152 at the time the computer system 154 receives the task request 200. For example, the objects 158 and/or other features of the environment 150 relevant to completing the task request 200 may not be within a field of view of any vision sensor the mobile robot 152 at the time the computer system 154 receives the task request 200. In a particular example, the mobile robot 152 may not be in a kitchen or in a pantry when it receives "bring me something to eat" as the task request 200. Features of at least some embodiments of the present technology include planning using an LLM. The planning can be related to such non-detectable objects 158, among other things. Relatedly, the planning can be relatively long-horizon and complex.

The method 100 can further include digitizing the task request 200, such as by converting the task request 200 from speech to text data. This can occur via the computer system 154. For example, the computer system 154 can include a speech-to-text converter (not shown) having an API through which it receives information, provides information, and/or otherwise communicates with other components of the computer system 154. As with other aspects of the computer system 154, the speech-to-text converter can be at least partially cloud based. Speech-to-text converters suitable for use in connection with various embodiments of the present technology include Amazon Transcribe (available from Amazon Web Services of Seattle, Washington) and Chirp (available from Alphabet of Mountain View, California). Alternatively, the computer system 154 may receive the task request 200 digitally such that there is no need for conversion. Furthermore, the requestor 156 can be remote from the mobile robot 152 when providing the task request 200. In these and other cases, the requestor 156 may generate the task request 200 while communicating with the mobile robot 600 via a handheld electronic device, such as a mobile phone. Furthermore, the requestor 156 may be another computer system, such as a facility management system.

As further shown in FIG. 1-3, the method 100 can include providing preliminary input information 202*a* to a generative AI system 204 (block 102*b*). The generative AI system 204 can include a language model 206 and a language model API 208 operably associated with one another. As with other aspects of the computer system 154, the generative AI system 204 can be at least partially cloud based. In at least some cases, the language model 206 is a general-purpose LLM. General-purpose LLMs suitable for use in connection with various embodiments of the present technology include CLAUDE (available from Anthropic of San Francisco, California), GPT-4 (available from OpenAI of San Francisco, California), GEMINI (available from Alphabet of Mountain View, California), and LLAMA 3 (available from Meta of Menlo Park, California). The language model 206 can receive information from, provide information to, and/or otherwise communicate with other portions of the computer system 154 via the language model API 208.

The preliminary input information 202*a* can be an instance of input information 202. Other data types may likewise be identified herein specifically (e.g., as instances) with a letter suffix or more generally without a letter suffix. Moreover, data associated with a given cycle, iteration, or the like of the information flow shown in FIG. 3 may be referenced herein with the same letter suffix. For example, instances of data associated with preliminary and subsequent cycles, iterations, or the like of such information flow may be referenced herein with the suffixes "a" and "b", respectively. Such instances can be the same or different from one cycle, iteration, or the like to another. As shown in FIG. 3, the input information 202 can include a prompt 210, a temperature setting 212, a reset instruction 214, robot API information 216, and a simulated conversation history 218. Not all of this information, however, is necessarily present in each instance of the input information 202. For example, an initial instance of the input information 202 may include no reset instruction 214 and/or no simulated conversation history 218. When present, the temperature setting 212 can indicate a desired randomness and variability in a response from the generative AI system 204. The generative AI system 204 can be configured to use the temperature setting 212 to change how it samples available data, with higher numbers corresponding to greater randomness and variability and lower numbers corresponding to lower randomness and variability.

When present, the reset instruction 214 can be an indication regarding whether or not the generative AI system 204 should reset a conversation state when responding to the input information 202. Conversation history can be detrimental or advantageous for achieving a desirable response from the generative AI system 204 depending on the circumstances. For example, as discussed above, the simulated conversation history 218 in accordance with at least some embodiments of the present technology may be a useful tool for robot planning. Correspondingly, the reset instruction 214 can be used to control when the generative AI system 204 does and does not consider conversation history. When present, the robot API information 216 can include instructions for interacting with the mobile robot 152. For example, the robot API information 216 can include available commands, descriptions of behaviors corresponding to the commands, descriptions of arguments to be passed to the mobile robot 152 via the commands, formats for the commands, formats for the arguments, etc. Different portions of the input information 202 can be incorporated into the prompt 210 or passed to the generative AI system 204 separately from the prompt 210. The language model API 208 can provide instructions regarding thee and other operational details.

In at least some cases, the method 100 includes generating the preliminary input information 202*a* and/or one or more other instances of the input information 202. Furthermore, generating different respective instances of the input information 202 can occur in series or in parallel. As shown in FIG. 3, the computer system 154 can include an input information generator 219 configured to generate one or more instances of the input information 202. The input information generator 219 can receive information from other portions of the computer system 154 and/or from outside the computer system 154. Furthermore, the input information generator 219 can include stored information available for combination with received information for generating the input information 202. For example, the input information generator 219 can store different robot API information 216 for different types of mobile robots including a type corresponding to the mobile robot 152. In these and other cases, the input information generator 219 can receive identification information 220 for the mobile robot 152 and associate the robot API information 216 with the input information 202 based at least partially in the identification information 220. The input information generator 219 can include a parser (not shown) that organizes at least some precursor information into one or more data structures amenable to further processing. The input information generator 219 can further include an assembler (also not shown) that assembles the parsed information alone or with other information to generate the input information 202.

The prompt 210 can include a request for target information 222 related to the mobile robot 152. In at least some cases, the target information 222 includes a command 224 for the mobile robot 152 or multiple commands 224 for the mobile robot 152, such as a sequence of commands 224. The command 224, sequence of commands 224, or other target information 222 can be pursuant to the task request 200. Individual commands 224 can include a function call, an argument, and/or any other suitable information for implementing the command 224 via the mobile robot 152. The robot API information 216 can indicate the type and format of such information. In at least some cases, the prompt 210 is in natural language. The prompt 210 can further include information that supports the request, such as orienting information, grounding information, perspective information, contextual information, etc. In at least some cases, the prompt 210 includes a description of the environment 150 and/or of the objects 158. The method 100 can include generating the description, such as via the generative AI system 204 or a different generative AI system based on sensor data (e.g., vision data) from the mobile robot 152.

As shown in FIG. 1, the method 100 can further include receiving a preliminary response 226*a* (as an instance of a response 226) from the generative AI system 204 (block 102*c*). The preliminary response 226*a* can correspond to the preliminary input information 202*a* including a preliminary prompt 210*a* as an instance of the prompt 210. The method 100 can further include parsing the preliminary response 226*a*. As shown in FIG. 3, the computer system 154 can include a response processor 228 including a parser 230. Parsing the preliminary response 226*a* can yield excerpts of the preliminary response 226*a* individually corresponding to the target information 222 or to non-target information 232. In at least some cases, the method 100 includes identifying the target information 222 in the preliminary response 226*a*, such as in one or more excerpts of the preliminary response

226*a*. The target information 222 can include the command 224 for the mobile robot 152. The method 100 can further include identifying the non-target information 232 in the preliminary response 226*a*, such as in one or more excerpts of the preliminary response 226*a*. The non-target information 232 can include conversational padding and/or other information less useful than the target information 222 for controlling the mobile robot 152. In some cases, the target information 222 is absent or inadequate in the preliminary response 226*a*. Examples of further processing in such cases are described below in the context of FIGS. 4 and 5.

With reference again to FIGS. 1-3, the target information 222, when present, can be a basis for determining the command 224. For example, the computer system 154 can include a command generator 234 that generates the command 224 based at least partially on the target information 222. Generating the command 224 can include identifying one or more functions with correct syntax in the target information 222. Once identified, the command generator 234 can send the command 224 to the mobile robot 152 for execution. Failure of this identification is among the examples described below in the context of FIGS. 4 and 5. Furthermore, even when identifying the command 224 succeeds or would succeed, the computer system 154 may bypass the command generator 234 in a cycle, iteration, or the like of the information flow shown in FIG. 3. For example, the target information 222, while suitable for generating the command 224, may nevertheless be suboptimal. In addition or alternatively, the computer system 154 may bypass generating the command 224 as a matter of course, such as on a first cycle, iteration, or the like of information flow pursuant to the task request 200.

The method 100 can further include generating a modified response 236 via the computer system 154 (block 102*d*). The modified response 236 can correspond to the preliminary response 226*a*. Furthermore, the modified response 236 can include the target information 222 and/or exclude the non-target information 232. As shown in FIG. 3, the computer system 154 can include a modified response generator 238 that receives the target information 222 and, in at least some cases, also receives the non-target information 232. Alternatively, the response processor 228 may discard the non-target information 232 rather than sending it to the modified response generator 238. In general, the modified response generator 238 can be configured to modify the preliminary response 226*a* in a way that causes it to be more effective, more efficient, and/or otherwise advantageous for controlling the mobile robot 152. As an example, generating the modified response 236 can include correcting a syntax error in the preliminary response 226*a*. As another example, generating the modified response 236 can include removing conversational padding from the preliminary response 226*a*. Syntax errors and conversational padding may tend to cause generating the command 224 from the response 226 to be less reliable than would otherwise be the case.

In yet another example, generating the modified response 236 can include changing the quantity of commands 224 in the preliminary response 226*a*. This can include increasing or decreasing the number of commands 224 based on one or more practical considerations. For example, when speed is paramount, it may be desirable to encourage the generative AI system 204 to output longer strings of commands 224 so that problematic processing latency associated with operating the generative AI system 204 is reduced or eliminated. In contrast, when reliability is paramount, it may be desirable to encourage the generative AI system 204 to output shorter strings of commands 224, e.g., one command 224 at a time. This can be useful, for example, to reduce or eliminate potentially inaccurate speculation by the generative AI system 204 about outcomes of the commands 224. When increasing the number of commands 224 in the modified response 236 relative to the preliminary response 226*a*, additional commands 224 can come from additional cycles, iterations, or the like of the information flow shown in FIG. 3. In addition or alternatively, generating the modified response 236 can include inserting or appending additional commands 224 algorithmically and/or based on heuristics. For example, it may be useful to follow a command 224 for moving to a new location with a command 224 for gathering sensor data at the new location. The modified response generator 238 can modify the preliminary response 226*a* to follow this and/or another convention. Moreover, the input information generator 219 can apply one or more conventions algorithmically to a sequence of commands 224 in the modified response 236.

The modified response generator 238 can include a formatter 240. The parser 230 of the response processor 228 and the formatter 240 of the modified response generator 238 can operate together to rewrite output from the generative AI system 204 to fit a desired format. For example, the parser 230 can be configured to leniently accept text and to transform this text into a desired structured output. The formatter 240 can be configured to receive the structured output and to rigidly transform it back into text. As shown in FIG. 3, the modified response generator 238 can send the modified response 236 to the input information generator 219. Both the response processor 228 and the modified response generator 238 can operate algorithmically. For example, the response processor 228 can search for, extract, label, and/or otherwise process predetermined text strings in the response 226 according to one or more algorithms. Similarly, the modified response generator 238 can combine, divide, modify, and/or otherwise process text strings from the response processor 228 according to one or more algorithms. In a particular example, when the language model 206 produces an answer, the modified response 236 includes the answer rewritten as formatter (parser (answer)). The input information generator 219 then incorporates this rewritten answer, rather than the original answer, into the simulated conversation history 218. Thus, the method 100 can further include generating the simulated conversation history 218 to include the modified response 236. In addition to the modified response 236, the simulated conversation history 218 can include the preliminary prompt 210*a* and/or one, some, or all other portion(s) of the preliminary input information 202*a* corresponding to the preliminary response 226*a*. Generating the simulated conversation history 218 can occur at the modified response generator 238, at the input information generator 219, and/or at one or more other suitable portions of the computer system 154.

As shown in FIG. 1, the method 100 can further include providing subsequent input information 202*b* to the generative AI system 204 (block 102*e*). The subsequent input information 202*b* can include the simulated conversation history 218. The subsequent input information 202*b* can further include a subsequent prompt 210*b*. In at least some cases, the subsequent input information 202*b* (e.g., as part of the subsequent prompt 210*b*) includes a request for the command 224. The request can be the same as or similar to a request included with the preliminary input information 202*a* (e.g., as part of the preliminary prompt 210*a*). Thus, the preliminary prompt 210*a* and the subsequent prompt 210*b* can request the same command 224. Furthermore, the subsequent input information 202*b* can include the modified response 236. In at least some cases, the subsequent input information 202*b* includes an instruction to reset a state of the generative AI system 204 via the reset instruction 214. This can be useful, for example, to enhance an influence of the simulated conversation history 218 on output from the generative AI system 204.

The method 100 can still further include receiving a subsequent response 226*b* from the generative AI system 204 (block 102*f*). The subsequent response 226*b* can correspond to the subsequent input information 202*b*. Finally, the method 100 can include controlling the mobile robot 152 based at least partially on the subsequent response 226*b* (block 102*g*). As discussed above, the command generator 234 can extract the command 224 from the subsequent response 226*b* and then pass the command 224 to the mobile robot 152 for execution. In at least some cases, the computer system 154 stores a queue of the commands 224 for future execution by the mobile robot 152. In these and other cases, the command generator 234 can add the command 224 from the subsequent response 226*b* to the queue. Execution of individual commands 224 can include operations such as data gathering via the mobile robot 152, movement of joints of the mobile robot 152, and outputting sound from the mobile robot 152, among other examples. Due at least partially to knowledge embodied in the language model 206 informing selection of the commands 224, such execution of the commands 224 can cause the mobile robot 152 to make progress toward satisfying the task request 200.

Figure 4:
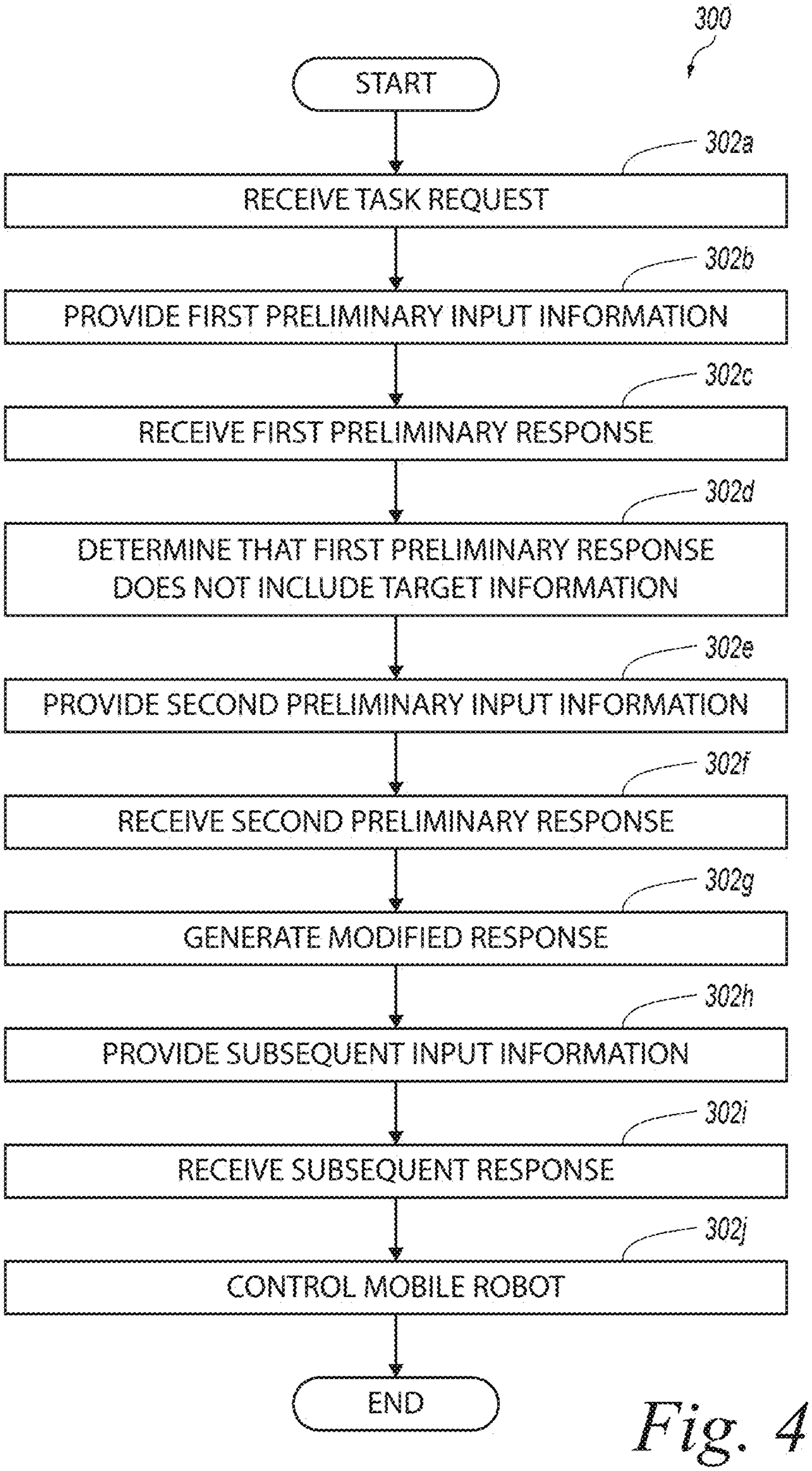
FIG. 4 is a block diagram corresponding to another method of planning in accordance with at least some embodiments of the present technology.
Figure 5:
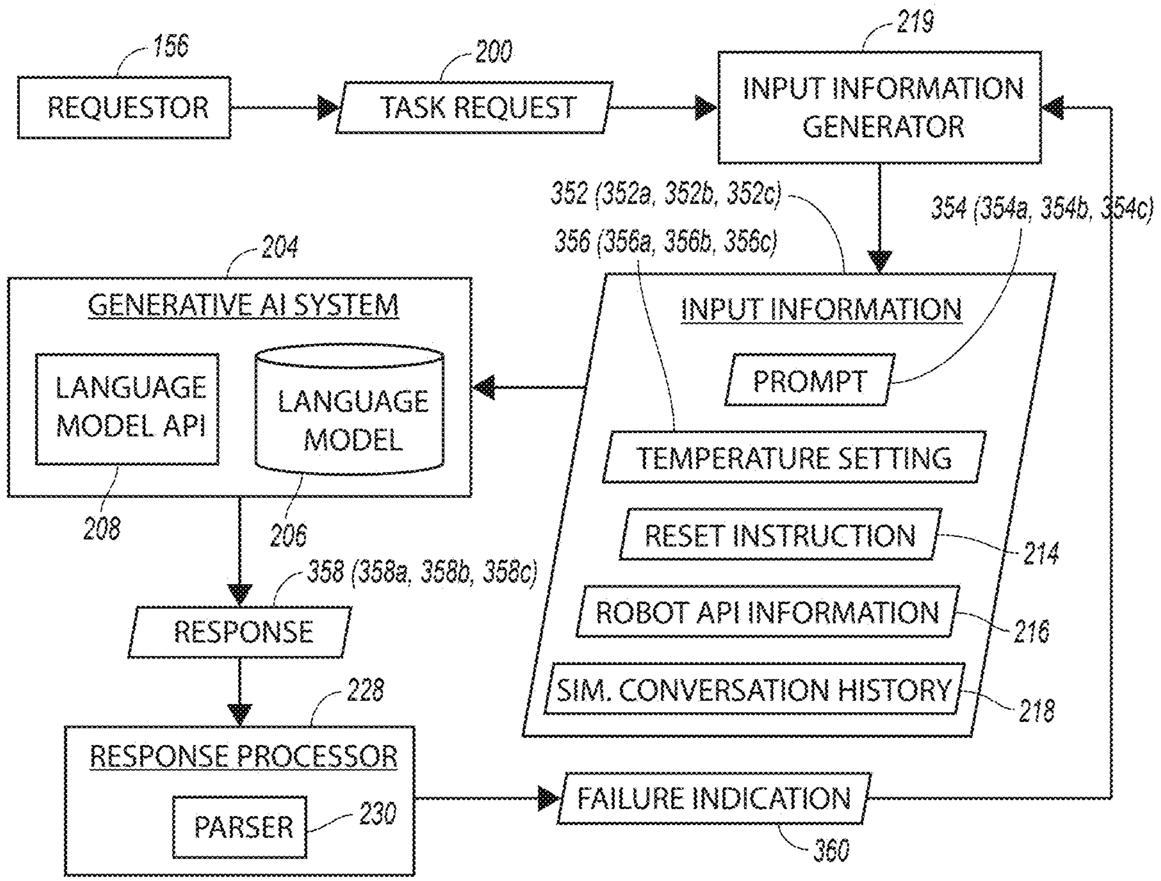
FIG. 5 is a block diagram illustrating an example of movement of information during an example of the method of FIG. 4.

FIG. 4 is a block diagram corresponding to another method 300 of robot planning in accordance with at least some embodiments of the present technology. The diagram includes blocks 302*a*-302*j* corresponding to different respective portions of the method 300. Certain portions of the method 300 may be the same as or similar to portions of the method 100. Accordingly, suitable features described above for the method 100 can likewise be present in at least some examples of the method 300. FIG. 5 is a block diagram illustrating an example of movement of information during an example of the method 300. Like the method 100, the method 300 can occur in the context of the environment 150 (FIG. 2). With reference now to FIGS. 2, 4 and 5 together, the method 300 can include receiving the task request 200 at the computer system 154 from the requestor 156 (block 302*a*). The method 300 can further include providing first preliminary input information 352*a* to the generative AI system 204 as an instance of input information 352 (block 302*b*). The first preliminary input information 352*a* can include a first preliminary prompt 354*a* (as an instance of a prompt 354) and a first preliminary temperature setting 356*a* (as an instance of a temperature setting 356). The method 300 can further include receiving a first preliminary response 354*a* from the generative AI system 204 as an instance of a response 358 (block 302*c*).

The method 300 can also include determining that the first preliminary response 358*a* does not include target information (block 302*d*). Output from the language model 206 can be difficult to predict. In some cases, the language model 206 may fail to generate requested information in response to the first preliminary prompt 354*a*. Target information absent from the first preliminary response 358*a* can include a command or some other information relevant to controlling the mobile robot 152. In at least some cases, the response processor 228 is configured to search for a text string in the first preliminary response 358*a* corresponding to the target information. Determining that the target information is absent from the first preliminary response 358*a* can include receiving an indication that the search failed to generate a suitable result. Alternatively or in addition, the first preliminary response 358*a* may have other deficiencies. For example, the first preliminary response 358*a* may include conflicting and/or excess information such that the response processor 228 cannot differentiate target information from non-target information. These and/or other issues may cause a failure of the first preliminary response 358*a* to parse via the parser 230.

The method 300 can further include providing second preliminary input information 352*b* to the generative AI system 204 (block 302*e*). This can occur after providing the first preliminary input information 352*a* to the generative AI system 204. Furthermore, providing second preliminary input information 352*b* to the generative AI system 204 can be at least partially in response to determining that the first preliminary response 358*a* does not include target information. As shown in FIG. 5, the response processor 228 can send a failure indication 360 to the input information generator 219. The second preliminary input information 352*b* can include a second preliminary prompt 354*b* and a second preliminary temperature setting 356*b*. In at least some cases, the first and second preliminary prompts 354*a*, 354*b* request the same or similar target information, such as the same or a similar command for the mobile robot 152 to execute pursuant to the task request 200.

The method 300 can also include receiving a second preliminary response 358*b* from the generative AI system 204 (block 302*f*). This can occur after receiving the first preliminary response 358*a* from the generative AI system 204. In at least some cases, the second preliminary temperature setting 356*b* is higher than the first preliminary temperature setting 356*a*. This can be useful, for example, to cause the second preliminary response 358*b* to be suitably different than the first preliminary response 358*a*. This difference, in turn, can decrease a likelihood of the second preliminary response 358*b* having the same deficiency as the first preliminary response 358*a*. In addition or alternatively, the second preliminary input information 352*b* can include a rephrase request. The rephrase request can explicitly instruct the generative AI system 204 to avoid causing the deficiency of the first preliminary response 358*a* to occur again in the second preliminary response 358*b*. The rephrase request can correspond to the first preliminary input information 352*a* and/or to the first preliminary response 358*a*. For example, the rephrase request may include an indication that the first preliminary response 358*a* was based on the first preliminary input information 352*a* and does not include target information.

Resampling the language model 206 can repeat until the response processor 228 determines that the response 358 is acceptable. For example, the response processor 228 may determine that the response 358 includes a command or other target information. The method 300 can then include generating a modified response (not shown in FIG. 5) (block 302*g*) and providing subsequent input information 352*c* to the generative AI system 204 (block 302*h*) including the modified response. The subsequent input information 352*c* can further include a subsequent prompt 354*c* and a subsequent temperature setting 356*c*. In at least some cases, the subsequent prompt 354*c* requests the same target information as the first and second preliminary prompts 354*a*, 354*b*. In these and other cases, the subsequent temperature setting 356*c* can be lower than the second preliminary temperature setting 356*b*. The method 300 can further include receiving a subsequent response 358*c* from the generative AI system 204 (block 302*i*). Finally, the method 300 can include controlling the mobile robot 152 based at least partially on the subsequent response 358*c* (block 352*j*).

Portions of the computer system 154 and associated flow of information downstream from the response processor 228 after the response processor 228 determines that the response 358 is acceptable can be the same or similar to those described above in the context of the method 100. In at least some cases, an instance of the simulated conversation history 218 in the subsequent input information 352*c* differs from an actual conversation history generated during execution of an example of the method 300 in that it excludes the first preliminary response 358*a*. This can be useful, for example, to prevent the generative AI system 204 from sampling the first preliminary response 358*a* and thereby allowing the first preliminary response 358*a* to influence generating the subsequent response 358*c* and other instances of the response 358 after the subsequent response 358*c*. Moreover, a modified response (not shown in FIG. 5) and an instance of the simulated conversation history 218 may be present in the input information 352 while resampling the language model 206 before providing the subsequent input information 352*c* to the generative AI system 204. Correspondingly, both generating responses 358 that replace previous responses 358 and generating responses 358 that build on previous responses 358 can be opportunities for improving still later responses 358.

Figure 6:
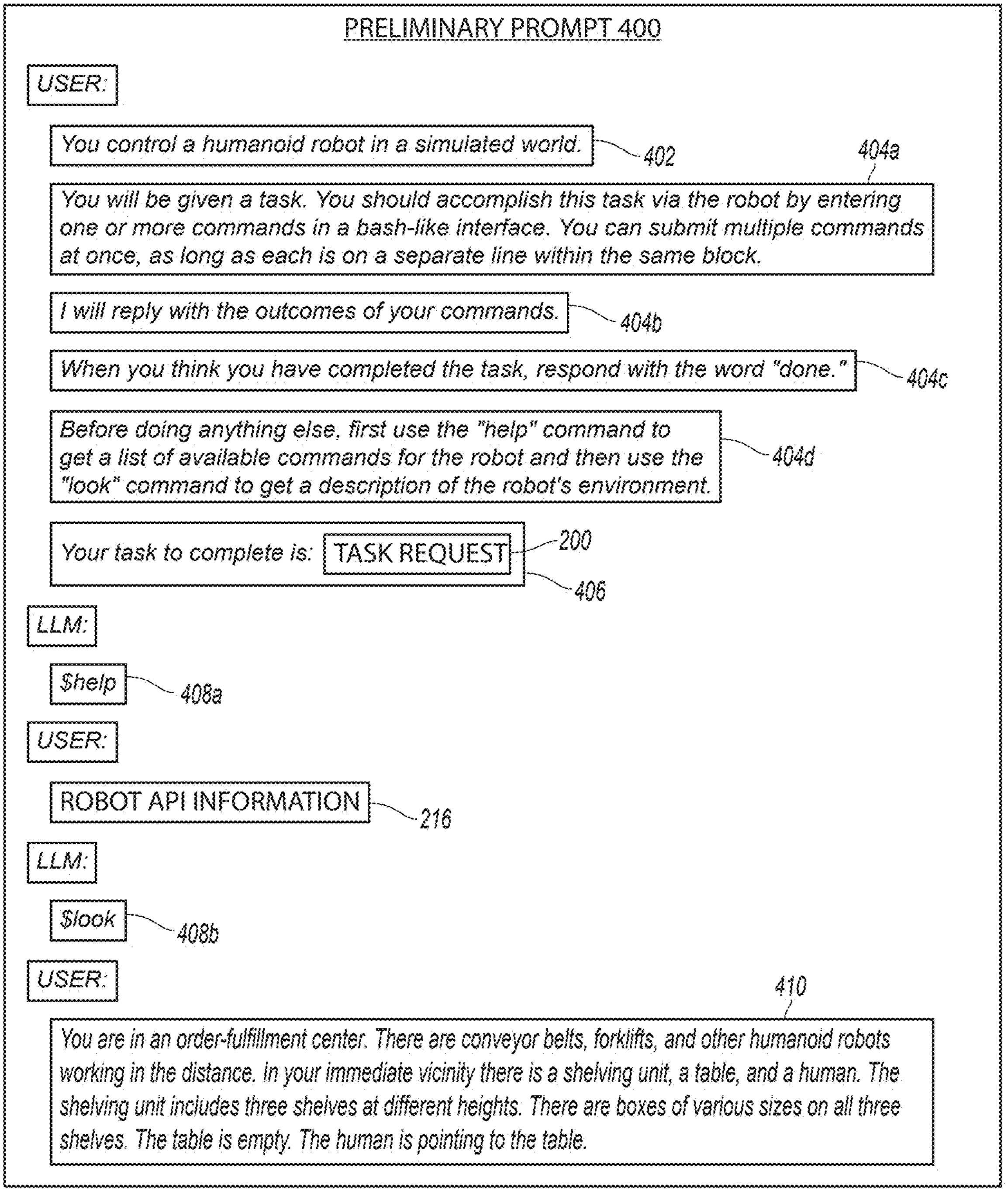
FIG. 6 is an example of a preliminary prompt generated during an example of the methods of FIGS. 1 and 4.

FIG. 6 is an example of a preliminary prompt 400 generated during an example of the methods 100, 300. The preliminary prompt 400 can correspond to one, some, or all of the preliminary prompt 210*a* in FIG. 3, the first preliminary prompt 354*a* in FIG. 5, the second preliminary prompt 354*b* in FIG. 5, and preliminary prompts in accordance with examples of methods in accordance with other embodiments of the present technology. As shown in FIG. 6, the preliminary prompt 400 can include a series of statements, some incorporating other portions of the input information 202, 352. The statements are organized into a sequence of queries from a user and responses from an LLM. The individual user statements and the individual LLM statements are presented under the headings "USER:" and "LLM:" respectively. Accordingly, the overall preliminary prompt 400 can be structured as a conversation history between the user and the LLM. Furthermore, rather than providing the robot API information 216 outright, the preliminary prompt 400 can provide the robot API information 216 in a simulated response from the user to a simulated presentation of a function call (e.g., "$help") for eliciting the robot API information 216 from the LLM. This can be useful, for example, to lay a foundation for the responses 226, 358. Thus, in at least some cases, the preliminary prompt 400 has features similar to features of the simulated conversation history 218.

As shown in FIG. 6, the preliminary prompt 400 can include an identity orienting statement 402, process orienting statements 404 (individually identified as process orienting statements 404*a*-404*d*) and a task orienting statement 406. The task orienting statement 406 can include the task request 200. The preliminary prompt 400 can further include user and LLM conversation turns, which, as discussed above, may or may not correspond to actual output from the generative AI system 204. The LLM conversation turns can include code statements 408 (individually identified as code statements 408*a*, 408*b*). Finally, the preliminary prompt 400 can include an environment description 410 corresponding to the environment 150. The environment description 410 can be predetermined. For example, the computer system 154 may store the environment description 410 with others in a library that the input information generator 219 accesses when generating the preliminary prompt 400. Alternatively or in addition, the environment description 412 can be generated dynamically, such via a separate process in which the generative AI system 204 or another generative AI system is prompted to generate the environment description 412 from sensor data, such as vision data collected via the mobile robot 152. Examples of the methods 100, 300, can include providing sensor data to a specialist generative AI system that is faster than the generative AI system 204. The specialist generative AI system can be configured to respond with the environment description 410.

Figure 7:
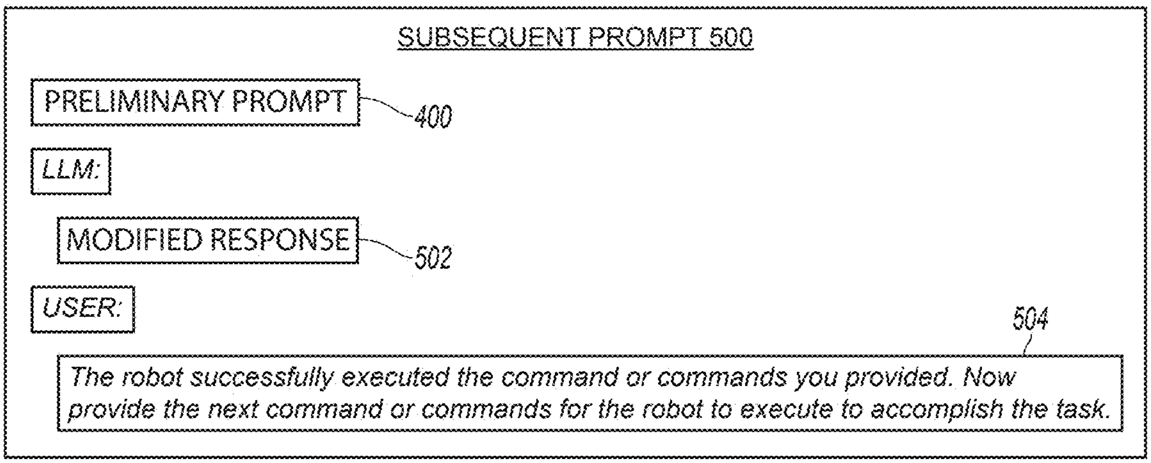
FIG. 7 is an example of a subsequent prompt generated during an example of the methods of FIGS. 1 and 4.

FIG. 7 is an example of a subsequent prompt 500 generated during an example of the methods 100, 300. The subsequent prompt 500 can correspond to one, some, or all of the subsequent prompt 210*b* in FIG. 3, the subsequent prompt 354*c* in FIG. 5, and subsequent prompts in accordance with examples of methods in accordance with other embodiments of the present technology. As shown in FIG. 7, the subsequent prompt 500 can include the preliminary prompt 400, a modified response 502 and a next-command request 504. The modified response 502 can correspond to the modified response 236 and/or a modified response in accordance with examples of methods in accordance with other embodiments of the present technology. As discussed above in connection with the modified response 236, the modified response 502 can be a modified form of a previous response corresponding to the response 226. For example, the modified response 502 can result from adding content to the previous response, removing content of the previous response, changing content of the previous response, reorganizing content of the previous response, and/or otherwise processing the previous response to be better suited for generating commands to be executed via the mobile robot 152.

FIG. 6 includes a specific example of the environment description 410. An example of the modified response 502 corresponding to this example of the environment description 410 is "$goTo('shelf')." An example of a precursor of this example of the modified response 502 is "Here's the next command I would use: '$goto(shelving unit)'." Generating the modified response 502 in this example can include removing conversational padding, changing punctuation, and changing syntax in the precursor. At least some of these changes can be implemented algorithmically. Furthermore, the modified response generator 238 can be configured to change or replace the names of functions, arguments, targets, etc. as needed. For example, the computer system 154 can include a relational database in which the correct names of selected targets (e.g., objects, locations, etc.) are associated with synonyms and/or other identifiers by which the generative AI system 204 may reference the same targets. The modified response generator 238 can use this relational database to identify and correct references in output from the generative AI system 204 as needed, such as to cause the references to correspond more closely to specifications of the robot API information 216. Alternatively or in addition, the generative AI system 204 or another generative AI system can be prompted to generate the modified response 502 from a precursor. For example, when the modified response generator 238 fails to generate the modified response 502 algorithmically, it can automatically request assistance from the generative AI system 204 or another generative AI system.

Examples of Mobile Robots

Figure 8:
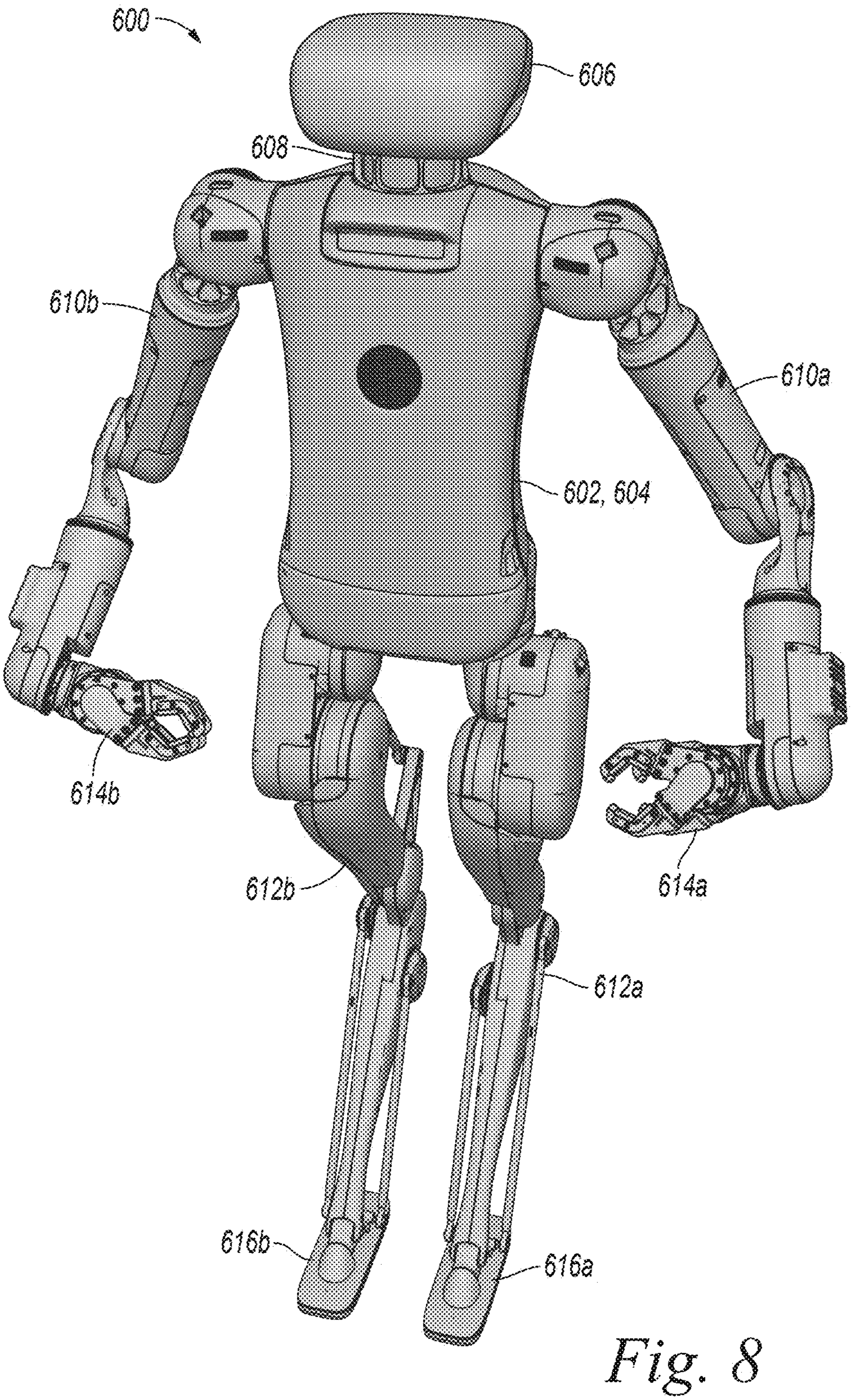
FIG. 8 is a perspective view of a mobile robot relevant to the methods of FIGS. 1 and 4.

FIG. 8 is a perspective view of a mobile robot 600 relevant to the methods 100, 300. For example, the mobile robot 600 can be an example of the mobile robot 152 (FIG. 2) discussed above. As shown in FIG. 8, the mobile robot 600 can include structures resembling human anatomy with respect to the features, positions, or other characteristics of such structures. In at least some cases, the mobile robot 600 defines a midsagittal plane about which the mobile robot 600 is bilaterally symmetrical. In these and other cases, the mobile robot 600 can be configured for bipedal locomotion similar to that of a human. Counterparts of the mobile robot 600 can have other suitable forms and features. For example, a counterpart of the mobile robot 600 can have a non-humanoid form, such as a canine form, an insectoid form, an arachnoid form, or a form with no animal analog. Furthermore, a counterpart of the mobile robot 600 can be asymmetrical or have symmetry other than bilateral. Still further, a counterpart of the mobile robot 600 can be configured for non-bipedal locomotion. For example, a counterpart of the mobile robot 600 can be configured for another type of legged locomotion (e.g., quadrupedal locomotion, hexapedal locomotion, octopedal locomotion, etc.) or non-legged locomotion (e.g., wheeled locomotion, continuous-track locomotion, etc.).

With reference again to FIG. 8, the mobile robot 600 can include a centrally disposed body 602 through which other structures of the mobile robot 600 are interconnected. As all or a portion of the body 602, the mobile robot 600 can include a torso 604. The mobile robot 600 can further include a head 606 superiorly spaced apart from the torso 604. The mobile robot 600 can also include a neck 608 through which the head 606 is connected to the torso 604 via a superior portion of the torso 604. The mobile robot 600 can further include articulated appendages carried by the torso 604. Among these articulated appendages, the mobile robot 600 can include arms 610 (individually identified as arms 610*a*, 610*b*) and legs 612 (individually identified as legs 612*a*, 612*b*). At individual articulations of the arms 610*a*, 610*b* and legs 612*a*, 612*b*, the mobile robot 600 can include a joint and a corresponding actuator, such as a rotary actuator with a motor and gearing (e.g., cycloidal gearing or strain-wave gearing). For clarity of illustration, the joints and actuators are not labeled in FIG. 8.

In at least some cases, the mobile robot 600 is configured to manipulate objects via the arms 610*a*, 610*b*, such as bimanually. In these and other cases, the mobile robot 600 can be configured to ambulate via the legs 612*a*, 612*b*, such as bipedally. Thus, the mobile robot 600 can be bimanual and bipedal. The arms 610*a*, 610*b* and the legs 612*a*, 612*b* can separately extend from the body 602 and define respective kinematic chains. In at least some cases, the respective kinematic chains corresponding to the arms 610*a*, 610*b* provide at least five degrees of freedom, such as exactly five or exactly six degrees of freedom. In these and other cases, the respective kinematic chains corresponding to the legs 612*a*, 612*b* can provide at least four degrees of freedom, such as exactly four, exactly five, or exactly six degrees of freedom. As parts of the arms 610*a*, 610*b*, the mobile robot 600 can include end effectors 614*a*, 614*b* at distalmost portions of the corresponding kinematic chains. Similarly, as parts of the legs 612*a*, 612*b*, the mobile robot 600 can include feet 616*a*, 616*b* at distalmost portions of the corresponding kinematic chains. Thus, the arms 610*a*, 610*b* and legs 612*a*, 612*b* can distally carry the end effectors 614*a*, 614*b* and the feet 616*a*, 616*b*, respectively.

Examples of Electrical, Computer, and Software Systems

Figure 9:
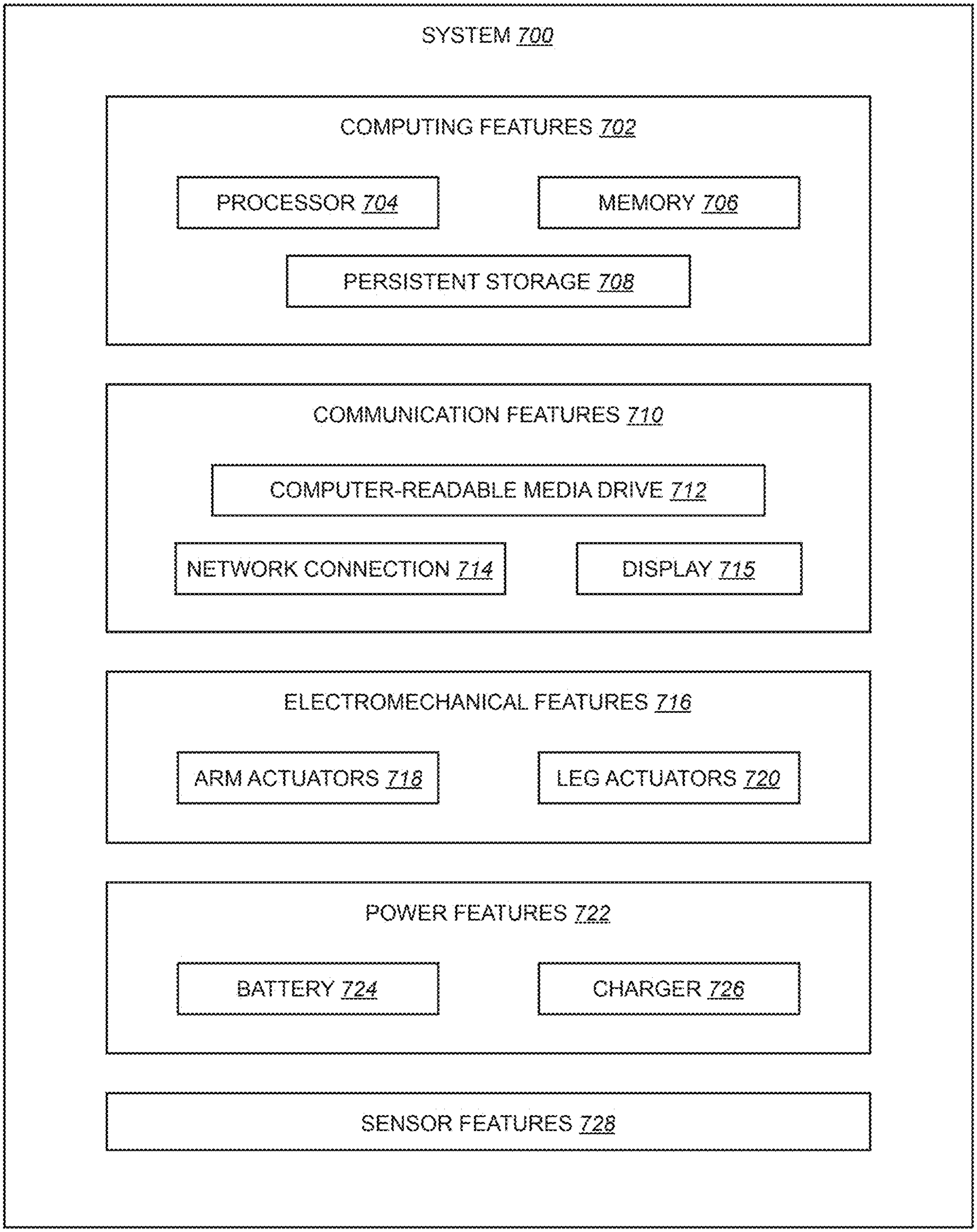
FIG. 9 is a block diagram depicting a system including electrical, computer, and software components operably associated with the mobile robot of FIG. 8.

FIG. 9 is a block diagram depicting a system 700 including electrical, computer, and software features operably associated with the mobile robot 600. When suitable, operations described elsewhere in this disclosure can be implemented at least partially via the devices and systems disclosed in this section. For example, the computer system 154 (FIG. 2) discussed above can be part of the system 700. As shown in FIG. 9, the system 700 can include computing features 702. The computing features 702 can include a processor 704, such as one or more general-purpose or special-purpose integrated circuits including digital logic gates for executing programs or for otherwise processing data. The computing features 702 can further include memory 706, such as one or more integrated circuits for storing data in use. The memory 706 can include a multi-threaded program, an operating system including a kernel, device drivers, etc. The computing features 702 can further include persistent storage 708, such as a hard drive for persistently storing data. Examples of data that can be stored by the persistent storage 708 include diagnostic data, sensor data, configuration data, environmental data, and current-state data. The computing features 702 can collectively define a computer configured to manage, control, receive information from, deliver information to, and/or otherwise usefully interact with other features of the system 700.

The system 700 can further include communication features 710. The communication features 710 can include a computer-readable media drive 712 for reading computer programs and/or other data stored on computer-readable media. As one example, the computer-readable media drive 712 can be a flash-memory drive. The communication features 710 can further include a network connection 714 for connecting the mobile robot 600 to other devices and systems, such as other mobile robots and/or other computer systems. The network connection 714 can be wired or wireless and can be via the Internet, a Local Area Network (LAN), a Wide Area Network (WAN), BLUETOOTH®, Wi-Fi®, a cellular-phone network, etc. The network connection 714 can include networking hardware, such as routers, switches, transmitters, receivers, computer-readable transmission media, etc. The communication features 710 can further include a display 715 (e.g., a touchscreen) and/or other suitable features for communicating with a user. The mobile robot 600 can use the communication features 710 for internal and/or external operations. Examples of these operations include interacting with systems that provide contextual information about the environment in which the mobile robot 600 operates and interacting with systems for changing operating conditions of the mobile robot 600.

The system 700 can further include electromechanical features 716. The electromechanical features 716 can include arm actuators 718 and leg actuators 720 at joints of the arms 610*a*, 610*b* and legs 120*a*, 120*b*, respectively, as discussed above. In addition or alternatively, the electromechanical features 716 can include other suitable features for implementing mechanical action within the mobile robot 600. As shown in FIG. 9, the system 700 can further include power features 722, such as a battery 724 and a charger 726. The battery 724 can be a lithium-ion battery, a sodium-ion battery, or a battery of another suitable type. The charger 726 can include a connector (not shown) compatible with a power source (e.g., a wall outlet, a charging station, etc.) and leads (not shown) extending between the connector and the battery 724. In at least some cases, the mobile robot 600 is configured to operate wirelessly via the battery 724 and to recharge via the charger 726.

Finally, the system 700 can include sensor features 728 for capturing, providing, and/or analyzing information about the mobile robot 600 itself and/or the environment in which the mobile robot 600 operates. The sensor features 728 can include a vision sensor (e.g., a camera), a light sensor (e.g., a photoresistor), a sound sensor (e.g., a microphone), a location sensor (e.g., a Global Positioning System (GPS) sensor), a two-dimensional sensor, a three-dimensional sensor, and/or a proximity sensor, among other examples. Within the body 602 and/or at one or more other suitable locations, the mobile robot 600 can include among the sensor features 728, an accelerometer, a gyroscope, a magnetometer, and/or a tilt sensor, among other examples. At the end effectors 614*a*, 614*b*, at the feet 616*a*, 616*b*, and/or at one or more other suitable locations, the mobile robot 600 can include among the sensor features 728, a contact sensor and/or a force sensor. In at least some cases, two or more different types of sensors are incorporated into a sensor assembly of the mobile robot 600. For example, an accelerometer, a gyroscope, and a magnetometer or another suitable combination of sensors can be incorporated into an inertial measurement unit (IMU) through which the mobile robot 600 can determine parameters such as acceleration, angular velocity, and orientation. The mobile robot 600 can include an IMU within the torso 604, within the head 606, and/or at one or more other suitable locations.

At one, some, or all of the arm actuators 718, at one, some, or all of the leg actuators 720, and/or at one or more other suitable locations, the mobile robot 600 can include among the sensor features 728, sensors that measure properties of corresponding joints. Such properties can include position, orientation (e.g., yaw, pitch, and roll), applied force (e.g., torque), elevation, mass, velocity, and acceleration, among other examples. The measurements of these properties can be direct or indirect. As an example of direct sensing, the mobile robot 600 may sense a torque acting on a given joint via a torque sensor operably associated with the joint, such as a torque sensor that outputs torque as function of current. As another example of direct sensing, the mobile robot 600 may sense a position of a given joint via an encoder operably associated with the joint. Any joint described herein should be construed as potentially including a torque sensor, encoder, and/or other suitable mechanism for direct sensing. As an example of indirect sensing, the mobile robot 600 may sense a position of a given one of the end effectors 614*a*, 614*b* or other feature based on perception data corresponding to the feature and other data corresponding to a reference. The mobile robot 600 can include one or more sensors in a sensor system, such as a vision system, a LIDAR system, a stereoscopic camera system, a SONAR system, etc. In at least some cases, the mobile robot 600 monitors itself and/or its environment in real-time or in near real-time. Moreover, the mobile robot 600 may use acquired sensor data as a basis for decision-making via the computing features 702.

Features of the system 700 can be connected to one another and/or to other features of the mobile robot 600 via suitable conductors, transmitters, receivers, circuitry, etc. While the system 700 configured as described may be used to support operation of the mobile robot 600, it should be appreciated that the mobile robot 600 may be operated using devices of various types and configurations and that such devices may have various components and levels of responsibility. For example, the mobile robot 600 may employ individual computer systems and/or controllers to manage discrete aspects of its operations, such as an individual computer system or controller to perform computer vision operations, a separate computer system or controller to perform power management, etc. In some cases, the mobile robot 600 employs the system 700 to control physical aspects of the mobile robot 600 according to one or more designated rules encoded in software. For example, these rules can include minimums and/or maximums, such as a maximum degree of rotation for a joint, a maximum speed at which a link is allowed to move, a maximum acceleration rate for the feet 616*a*, 616*b*, etc. The mobile robot 600 may include any number of mechanical aspects and associated rules, which may be based on or otherwise configured in accordance with the purpose of and/or functions performed by the mobile robot 600.

Software features of the system 700 and other computer systems described herein may take the form of computer-executable instructions, such as program modules executable by the computing features 702. Generally, program modules include routines, programs, objects, data structures, or the like configured to perform particular tasks based on source data, which may be encrypted. Control scripts may be implemented via a suitable language, such as C/C++ or Python®. The functionality of the program modules may be combined or distributed in various embodiments, including in cloud-based implementations. Furthermore, certain aspects of the present technology can be embodied in special purpose computers or data processors, such as in application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a LAN, a WAN, or the Internet. In a distributed computing environment, program modules and other features may be located in both local and remote memory storage and in other devices, which may be in communication via one or more wired or wireless communication channels.

Aspects of the present technology may be stored or distributed on tangible computer-readable media, which can include volatile or non-volatile storage features, such as magnetically or optically readable computer media, hard-wired or preprogrammed chips (e.g., electrically erasable programmable read-only memory semiconductor chips), nanotechnology memory, or other computer-readable storage media. Alternatively, computer-implemented instructions, data structures, screen displays, and other data under aspects of the present technology may be distributed (encrypted or otherwise) over the Internet or over other networks (including wireless networks) on a propagated signal on a propagation medium (e.g., electromagnetic wave(s), sound wave(s), etc.) over a period of time. Furthermore, such data may be provided on an analog or digital network and packet switched, circuit switched, or managed under another suitable scheme. The term computer-readable storage medium as used herein does not, however, encompass signals themselves (e.g., propagating signals) or transitory media. One of ordinary skill in the art will recognize that various features of the mobile robot 600 and other devices and systems described herein may communicate via any number of wired or wireless communication techniques and that elements of such devices and systems may be distributed rather than located in a single monolithic entity. Finally, electrical and computing aspects of systems in accordance with various embodiments of the present technology may operate in environments or according to processes other than the examples of environments and processes described herein.

Figure 10:
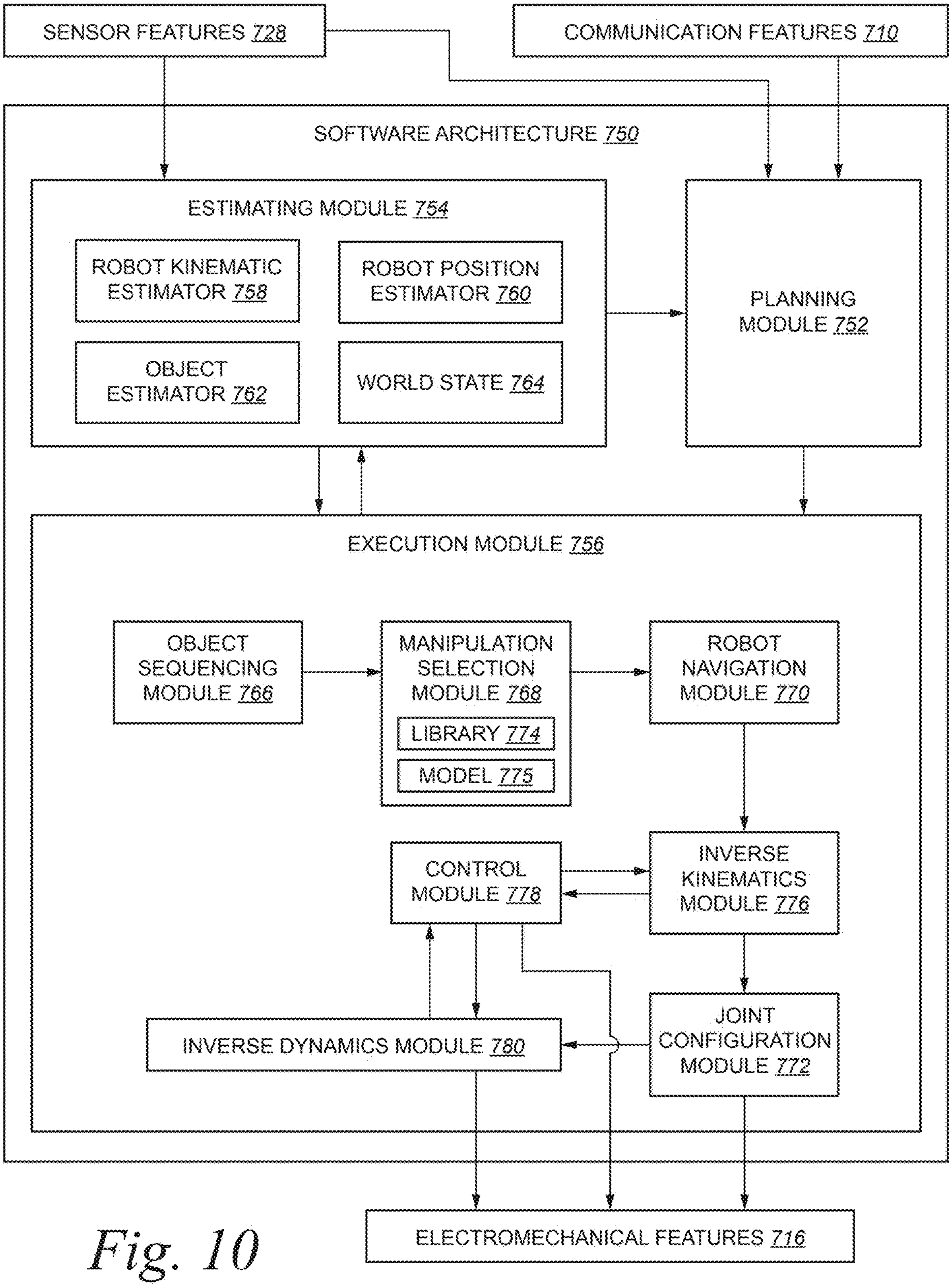
FIG. 10 is a block diagram depicting software architecture and associated portions of the system of FIG. 9.

FIG. 10 is a block diagram depicting software architecture 750 and associated portions of the system 700. The software architecture 750 can be within the memory 706 or otherwise operably associated with any or all of the various features of the system 700 as described above. With reference to FIGS. 9 and 10 together, the software architecture 750 can include a planning module 752, an estimating module 754, and an execution module 756 operably associated with one other. The planning module 752 can be configured to relay or to generate a plan corresponding to an objective for the mobile robot 600 (e.g., unload all objects on a shelf, retrieve an object from a first location and move the object to a second location, etc.). In at least some cases, the planning module 752 receives information from the communication features 710 of the system 700 and relays or generates a plan based at least partially on the received information. For example, the planning module 752 may receive a task request from a user via the communication features 710 and relay the task request as a plan. As another example, the planning module 752 may receive a task request from a user via the communication features 710 and generate a plan related to the task request. As yet another example, the planning module 752 may generate a plan without receiving a task request from a user, such as at a predetermined time and/or in response to information about a current state of the mobile robot 600 or the environment received via the sensor features 728 of the system 700. Software components of the computer system 154 (FIG. 2) discussed above in connection with the methods 100, 300 can be implemented in the software architecture 750 via the planning module 752.

The estimating module 754 can receive information from the sensor features 728 and generate estimates in real time or in near real time to inform generating and/or executing a plan. The estimating module 754 can include a robot kinematic estimator 758, a robot position estimator 760, an object estimator 762, and a world state 764. The robot kinematic estimator 758 can generate an estimate of a current kinematic state of the mobile robot 600 (e.g., balanced, off-balance, walking, standing, etc.) and estimates of positions of individual joints of the mobile robot 600. The robot position estimator 760 can generate a current estimate of a position of the mobile robot 600 within an environment. This position can be a set of coordinates and can be based on perception information, GPS information, and/or other information received by or generated by the mobile robot 600. Perception information potentially relevant to the position of the mobile robot 600 includes, among other examples, information corresponding to distances between the mobile robot 600 and landmarks in an environment and information corresponding to fiducial markings (e.g., AprilTags) carried by or otherwise associated with the landmarks. This information can be detected, for example, via a camera of the mobile robot 600. Furthermore, information can move between components of the estimating module 754. For example, the world state 764 can receive information from the robot kinematic estimator 758, the robot position estimator 760, and the object estimator 762. In addition or alternatively, the object estimator 762 can receive information from the robot kinematic estimator 758 and the robot position estimator 760.

The object estimator 762 can generate a current estimate of an object (e.g., a tote) within an environment. In at least some cases, the estimate is a pose or other reference corresponding to a position and orientation of the object. As with the position of the mobile robot 600 itself, the position of an object can be a set of coordinates and can be based on perception information, GPS information, and/or other information received by or generated by the mobile robot 600. Perception information potentially relevant to the position of an object includes, among other examples, information corresponding to distances between the object and the mobile robot 600, distances between the object and landmarks in an environment, and information corresponding to fiducial markings (e.g., AprilTags) carried by or otherwise associated with the object. This information can be detected, for example, via a camera of the mobile robot 600. In at least some cases, the object estimator 762 uses information (e.g., sensor poses) from the robot kinematic estimator 758 and/or the robot position estimator 760 to inform generation of object estimates. This can be useful, for example, when a fiducial or other landmark in an environment is not visible. The object estimator 762 can be configured to update the world state 764 with object references and/or other information related to objects in an environment in which the mobile robot 600 operates. Furthermore, the object estimate can include an identification of an object and properties (e.g., dimensions) associated with that identification. For example, the object estimator 762 can include a object-recognition model (e.g., Detectron2 (Facebook AI Research) with Mask R-CNN implementation) that receives perception information (e.g., an image) corresponding to an object and outputs an object identification based at least partially on the perception information. The object estimator 762 can further include a lookup table for generating object properties based at least partially on this object identification.

The execution module 756 can be configured to receive a plan from the planning module 752 and estimates from the estimating module 754. The plan can include one or more commands 224 as discussed above in connection with examples of the methods 100, 300. The execution module 756 can include an object sequencing module 766, a manipulation selection module 768, a robot navigation module 770, and a joint configuration module 772. The planning module 752 can be configured to send a plan to the object sequencing module 766, to the manipulation selection module 768, to the robot navigation module 770, or to the joint configuration module 772 based on attributes of the plan. For example, when a plan includes explicit instructions for positions of the electromechanical features 716 of the system 700, the planning module 752 can send the plan to the execution module 756 via the joint configuration module 772. As another example, when a plan does not involve manipulating an object, the planning module 752 can send the plan to the execution module 756 via the robot navigation module 770. As yet another example, when a plan concerns only one object and the object is remote to the mobile robot 600, the planning module 752 can send the plan to the execution module 756 via the manipulation selection module 768. As a final example, when a plan concerns multiple objects remote to the mobile robot 600, the planning module 752 can send the plan to the execution module 756 via the object sequencing module 766.

The object sequencing module 766 can receive one or more estimates from the estimating module 754 and can generate a sequence in which multiple objects are to be manipulated. For example, when the object sequencing module 766 receives a plan to unload a shelf, the object sequencing module 766 can query the estimating module 754 for current locations of objects on the shelf. The object sequencing module 766 can then assign the objects an order, convert the order into a queue, and pass the queue to the manipulation selection module 768. The manipulation selection module 768 can include a library 774 including manipulation primitives and/or sequences of manipulation primitives that can be used to manipulate an object. The manipulation selection module 768 can select manipulation primitives and/or sequences for a given object based on contextual information, such as information about the object and/or information about the environment. In addition or alternatively, the manipulation selection module can include a model 775 that outputs manipulation estimates based on contextual information. The model 775 can be a machine-learning model generated by a machine-learning algorithm (e.g., a reinforcement-learning algorithm) trained on real and/or simulated contextual information. The robot navigation module 770 can generate targets for different parts of the mobile robot 600 further to a manipulation or other portions of a plan being executed. Examples of targets include positions of the feet 616*a*, 616*b* in the environment, positions of the end effectors 614*a*, 614*b* in the environment, etc. The robot navigation module 770 can update these targets continuously or near continuously based on information from the estimating module 754. The execution module 756 can further include an inverse kinematics module 776 that translates the targets from the robot navigation module 770 into joint configurations throughout the mobile robot 600.

The execution module 756 can also include a control module 778 that receives joint configurations from the inverse kinematics module 776 and generates joint parameters (e.g., positions, velocities, accelerations, etc.) to be executed by the mobile robot 600 via the electromechanical features 716 of the system 700 to achieve these joint configurations. Through continuous or near-continuous communication with the inverse kinematics module 776, the control module 778 can modify the joint parameters to at least partially compensate for deviations as the mobile robot 600 executes the joint configurations. The inverse kinematics module 776 can send other joint configurations not subject to active control to the joint configuration module 772 directly. Similar to the control module 778, the joint configuration module 772 can generate joint parameters (e.g., positions, velocities, accelerations, etc.) to be executed by the mobile robot 600 to achieve joint configurations received from the inverse kinematics module 776 or from the planning module 752.

Finally, the execution module 756 can include an inverse dynamics module 780 that receives joint parameters from the control module 778 and from the joint configuration module 772. The inverse dynamics module 780 can track a desired wrench of the mobile robot 600 and its relationship with objects in the environment. In at least some cases, the inverse dynamics module 780 references a map of robot positions and wrenches to joint torques. Based at least partially on tracking these joint torques, the inverse dynamics module 780 can modify joint parameters to achieve a desired result. For example, the inverse dynamics module 780 may modify joint parameters from the control module 778 and from the joint configuration module 772 to maintain contact between the end effectors 614*a*, 614*b* and an object as the mobile robot 600 carries the object. The inverse dynamics module 780 can then send modified joint parameters to the electromechanical features 716 of the system 700 for execution. For configurations that do not involve dynamic interaction with the environment, the control module 778 and the joint configuration module 772 can send joint parameters directly to the electromechanical features 716 for execution.

With reference to FIGS. 9 and 10 together, suitable software components disclosed herein can be part of a distributed system or component thereof or implemented as one or more network-based services. For example, a compute cluster within a computing service may present computing or storage services or other types of services that employ any distributed computing systems described herein to clients as network-based services. In some embodiments, a network-based service may be implemented by a software or hardware system designed to support interoperable machine-to-machine interaction over a network. A network-based service may have a gateway described in a machine-processable format. Other systems may interact with the network-based service in a manner prescribed by the description of the network-based service's gateway. For example, the network-based service may define various operations that other systems may invoke. Relatedly, the network-based service may define a particular API to which other systems may be expected to conform when requesting the various operations. In the cloud provider network context, APIs may provide a gateway for customers to access cloud infrastructure by allowing customers to obtain data from and/or to cause actions within the cloud provider network, enabling the development of applications that interact with resources and services hosted in the cloud provider network. APIs can also enable different services of the cloud provider network to exchange data with one another.

In a distributed system, some or all of the software architecture 750 and other software described herein can be executed remotely from the mobile robot 600. For example, the mobile robot 600 can be configured to collect raw sensor data via the sensor features 728 of the system 700 and to transmit some or all of this raw sensor data to a remote server in real time or near real time for processing. The mobile robot 600 can then receive joint commands and/or other products of this processing via communication with the server. In these and other cases, computing operations can be allocated among local and remote computing systems depending on factors such as computing demand, available computing resources, time sensitivity of computing products, etc. Moreover, even the sensor features 728 can be remote from the mobile robot 600 in certain cases. For example, a remote sensor may track its reference frame relative to a local sensor of the mobile robot 600 and may communicate that reference frame with sensor data it collects at any given time. A server receiving the sensor data can then use the relationship between the reference frame of the local sensor and the reference frame of the remote sensor to generate output in a reference frame compatible with processes that rely on sensor data from the local sensor only. Alternatively, in a non-distributed system, all information processing and command execution can occur locally at the mobile robot 600 or other local hardware depending on the implementation.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms “a,” “an,” and “the” include plural referents unless the context clearly indicates otherwise. Similarly, unless the word “or” is expressly limited to mean only a single item exclusive from the other items in reference to a list of two or more items, then the use of “or” in such a list is to be interpreted as including (a) any single item in the list, (b) all of the items in the list, or (c) any combination of the items in the list. Any reference herein to “the inventors” means at least one inventor of the present technology. As used herein, the terms “generally,” “substantially,” “about,” and similar terms are used as terms of approximation and not as terms of degree, and are intended to account for the inherent variations in measured or calculated values that would be recognized by those of ordinary skill in the art. Additionally, the terms “comprising,” “including,” “having,” and the like are used throughout this disclosure to mean including at least the recited feature(s) such that any greater number of the same feature(s) and/or one or more additional types of features are not precluded. This is the case even if a particular number of features is specified unless that specified number is preceded by the word “exactly” or another clear indication that it is intended to be closed ended. In a particular example, “comprising two arms” means including at least two arms. References herein to any of receiving, determining, generating, and selecting information in accordance with various embodiments of the present technology encompass, when feasible, the others of receiving, determining, generating, and selecting the information and indicate that such operations can occur at least partially via the relevant computing subsystem.

Directional terms, such as “upper,” “lower,” “front,” “back,” “vertical,” and “horizontal,” may be used herein to express and clarify the relationship between various structures. It should be understood that such terms do not denote absolute orientation. Reference herein to “one embodiment,” “an embodiment,” or similar phrases means that a particular feature, structure, or operation described in connection with such phrases can be included in at least one embodiment of the present technology. Thus, such phrases as used herein are not all referring to the same embodiment. Unless preceded with the word “conventional,” reference herein to “counterpart” devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

I claim:

1. A method comprising:

providing, to a generative artificial intelligence system, first preliminary input information including a first preliminary prompt requesting target information;

receiving, from the generative artificial intelligence system, a first preliminary response corresponding to the first preliminary input information;

determining that the first preliminary response does not include the target information;

providing, to the generative artificial intelligence system and at least partially in response to determining that the first preliminary response does not include the target information, second preliminary input information including a second preliminary prompt requesting the target information;

receiving, from the generative artificial intelligence system, a second preliminary response corresponding to the second preliminary input information;

generating, at a computer system operably associated with a mobile robot, a modified response corresponding to the second preliminary response;

providing, to the generative artificial intelligence system, subsequent input information including the modified response;

receiving, from the generative artificial intelligence system, a subsequent response corresponding to the subsequent input information; and controlling the mobile robot based at least partially on the subsequent response.

2. The method of claim 1, wherein generating the modified response includes correcting a syntax error in the second preliminary response.

3. The method of claim 1, wherein generating the modified response includes removing conversational padding from the second preliminary response.

4. The method of claim 1, wherein the second preliminary input information includes application programming interface information for the mobile robot.

5. The method of claim 1, wherein the subsequent input information includes a simulated conversation history including the modified response.

6. The method of claim 5, wherein the simulated conversation history is a truncated version of an actual conversation history with the generative artificial intelligence system.

7. The method of claim 5, wherein the simulated conversation history includes the second preliminary prompt.

8. The method of claim 1, wherein the subsequent input information includes an instruction to reset a state of the generative artificial intelligence system.

9. The method of claim 1, wherein providing the second preliminary input information includes providing, to a language model of the generative artificial intelligence system, the second preliminary prompt in natural language.

10. The method of claim 1, wherein:

the method further comprises identifying the target information in the second preliminary response; and generating the modified response includes generating the modified response to include the target information.

11. The method of claim 10, wherein:

the method further comprises parsing the second preliminary response via a parser of the computer system to generate second preliminary response excerpts; and identifying the target information includes identifying the target information in one or more of the second preliminary response excerpts.

12. The method of claim 10, wherein the target information includes a command for the mobile robot.

13. The method of claim 12, wherein the second preliminary prompt includes a request for the command.

14. The method of claim 1, wherein:

the method further comprises identifying non-target information in the second preliminary response; and generating the modified response includes generating the modified response to exclude the non-target information.

15. The method of claim 14, further comprising:

parsing the second preliminary response via a parser of the computer system to generate second preliminary response excerpts; and identifying the non-target information in one or more of the second preliminary response excerpts.

16. The method of claim 15, wherein the non-target information includes conversational padding.

17. The method of claim 1, wherein:

the first preliminary input information includes a first temperature setting; and the second preliminary input information includes a second temperature setting higher than the first temperature setting.

18. The method of claim 1, wherein the second preliminary input information includes a rephrase request corresponding to the first preliminary input information and further corresponding to the first preliminary response.

19. The method of claim 18, wherein the rephrase request includes an indication that the first preliminary response does not include the target information.

* * * * *